United States Patent [19]

Zelenka

[11] 3,784,947
[45] Jan. 8, 1974

[54] TEMPERATURE RESPONSIVE SWITCH
[75] Inventor: Donald J. Zelenka, Flushing, Mich.
[73] Assignee: General Motors Corporation, Detroit, Mich.
[22] Filed: Dec. 4, 1972
[21] Appl. No.: 311,933

[52] U.S. Cl. .................. 337/320, 337/1, 337/119
[51] Int. Cl. ............................................ H01h 37/40
[58] Field of Search ................... 337/1, 119, 117, 337/308, 320, 321, 322, 407, 408, 409, 393

[56] References Cited
UNITED STATES PATENTS
| 2,201,039 | 5/1940 | Hammond | 337/320 X |
| 2,445,625 | 7/1948 | Meinholdt | 337/320 X |
| 3,379,845 | 4/1968 | Mertler | 337/117 X |

Primary Examiner—Roy N. Envall, Jr.
Attorney—Sidney Carter et al.

[57] ABSTRACT

This invention relates to a temperature switch and more particularly to a temperature responsive switch used in a catalytic converter generally found in internal combustion engine exhaust systems. The temperature switch is an independent self-contained unit that is mounted directly on the converter and has a sensing element that extends into the converter to activate switch contacts to provide an initial signal, as well as a second signal that the catalyst within the converter may become ineffective due to deterioration of the catalyst and therefore maintenance of the converter is required. The signal could also be used to activate bypass means in or adjacent to the converter.

2 Claims, 1 Drawing Figure

PATENTED JAN 8 1974
3,784,947
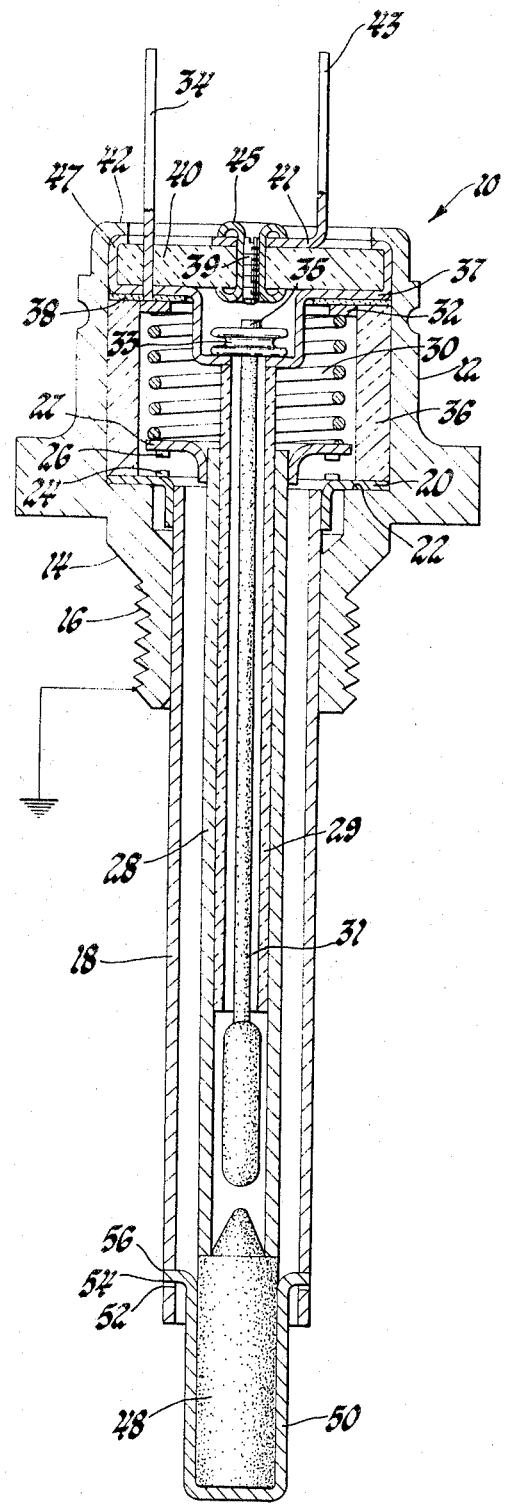

TEMPERATURE RESPONSIVE SWITCH

This invention relates to a temperature responsive switch having a sensing element inserted into a catalytic converter to provide a warning signal that the converter may not be functioning properly because the catalyst may become ineffective due to deterioration. Problems of air pollution from internal combustion engines and the use of catalytic converters in the exhaust system of such engines to minimize air pollution has led to the requirement for a simple and inexpensively manufactured temperature sensing device to be used within the converter to detect failure of the catalyst in the converter. Most of the similar devices available are delicately constructed as well as expensive to manufacture and therefore impractical for use as temperature switches in the automobile application. Similar devices available do not perform properly in the rigorous environment and the rigorous use that they are put to when installed in automobile converters and further any sensors practical for use are very costly and complex to produce by mass production techniques.

Accordingly, it is an object of the present invention to provide a simple, reliable and inexpensive switch having means for sensing excessive temperature in the converter as well as the failure of the catalyst in the converter.

Another object is to provide a switch that gives two signals at different time intervals.

A further object is to provide a temperature device that is directly connected to the converter and has a sensing element on a probe within the converter that is constructed of the same catalyst material found in the converter.

Another object is to provide a temperature switch having interchangeable sensing means.

Another object of the invention is to provide a temperature switch that can be produced and assembled by mass production techniques.

A further object is to provide a temperature sensing switch that is compact and self-contained and therefore can be manufactured and adapted for use as an assembly for easy insertion into a converter.

Further objects and advantages of the present invention will be apparent from the following description, reference being had to the accompanying drawing wherein a preferred embodiment of the present invention is clearly shown.

The FIGURE shows a cutaway sectional view of the preferred embodiment of the invention.

Referring to the drawing, there is shown a switch housing 10 generally constructed of a one-piece body member 12 that may be made of stainless steel or the like, having attachment means 14 in the form of a threaded neck portion 16 at one end thereof.

Assembled within the body 12 is a tube assembly 18 that has a flared out attaching portion 20 at one end thereof that rests on a shoulder 22 in body 12 and makes electrical contact with the body. Tube assembly 18 extends through the neck portion 16 and is of sufficient length to extend into the catalyst bed of the converter, when the housing is attached to the converter. Tube assembly 18 and the flared attaching portion 20 are made of Inconel or similar type metals in order to withstand the heat within the converter. Electrically connected to tube assembly 18 are a set of contacts 24 that may be formed directly on the flared portion 20 of the tube or may be independently formed and attached thereto by some means such as welding, brazing or the like. A second set of contacts 26 are located opposite contacts 24 and are attached to a flanged or turned over portion 27 on a movable inner or actuator tube member 28 that may also be made of stainless steel or Inconel as is tube 18. Spring 30 rests on the flanged portion 27 and electrically connects the two sets of contacts, when they are closed, to a terminal ring 32 having a connector 34 that extends through the body 12 at the end opposite from the threaded neck portion 16.

Within tube 28 and insulated therefrom by a ceramic insulator sleeve 29 or other known insulator means is a capillary tube 31 of the type well known in the art, having a diaphragm 33 within body 12, with a single contact 35 thereon. Diaphragm 33 is made of corrugated metal or similar materials in order to withstand the high operating temperatures of the converter. Tube 31 is held in position within body 12 by a tube holding member 37 that has a generally cup shaped or U-shaped portion extending downwardly into body 12, within spring 30. Opposite contact 35 is a second single adjustable contact 39 that is connected to a terminal 41 having connector 43 thereon. Contact 39 and terminal 41 are electrically insulated from the tube holding member 37 by a ceramic insulator 40 or the like and are held in position on the insulator by a hollow rivet 45 or similar means having threads therein to receive the adjustable contact 39. Diaphragm 33 is held in the cup shaped member 37 with the contacts 35,39 being normally open.

Contacts 26, spring 30 and the terminal 32 are electrically insulated from the body 12 by insulating means 36, 38. Insulator 36 is adjacent the inside wall of body 12 and insulator 38 is located between tube holding member 37 and terminal ring 32. Insulator means 36 can be a ceramic insulator, and insulator 38 can be made of mica, for example. The components assembled within the body 12 are held in place by rolled-over portions 42 formed on the body 12 that bear against flanges 47 on the tube holding member 37 and the insulating means 31, 38 and 40.

Actuator tube 28 generally extends the full length of the tube assembly and engages a second rod 48 that is formed of a catalyst material which is inserted in a tube or can member 50. The catalyst material that makes up the second rod 48 is the same as the catalyst material found in the converter. It is understood that metal or other means having a melt point or deterioration point the same as the catalyst could be used. The length of the tubular formed catalyst 48 is such that it forces actuator tube 28 upwardly into the body member 12 to push the spring toward terminal 32 to maintain contacts 24,26 in a normally open position. Actuator tube 28 is therefore spring biased in a downward direction and the contacts are normally open. Can member 50 is connected to tubular member 18 by a bayonet type connection 52. Bayonet connector 52 is generally formed of a pair of ear members 54 on tubular member 18 and mating pin members 56 on the can 50 with such connectors being well known in the art.

In operation the housing 10 is screwed into a catalytic converter forming a path to ground through neck 16. The tubular member 18 having actuator tube 28 therein and can 50 attached thereto, extend into the converter and into the catalyst bed. The length of the catalyst rod 48 determines the distance that the contacts are apart and therefore determines the length of time the catalyst within the converter can be exposed to high temperature without damage. If the catalyst is exposed to high temperature beyond this period, the catalyst in the converter will begin to deteriorate. The catalyst rod 48 being of a smaller volume than the catalyst bed in the converter will deteriorate faster than the catalytic bed and due to deterioration will shrink causing actuator tube 28 urged by spring 30, to move downwardly. When the catalyst rod 48 has deteriorated to the point where the converter could be damaged, contacts 24,26 close to provide a signal through connector 34 and ground, to a telltale or the like that the catalyst within the converter is in danger of deterioration and therefore the converter should be serviced. Upon the converter being serviced, which would generally be at time that replacement of the catalyst is required, the can member 50 is disconnected from the tubular member 18 and catalyst rod 48 within can 50 is replaced or a new can member containing the catalyst rod could be replaced as a unit.

Capillary tube 31 provides a second circuit for signal means which circuit can also be used to energize a telltale or light or similar means at a later or more critical point than the first signal generated because of the deterioration of catalyst rod 48. The circuit may also be used to control a converter bypass system. A solenoid operated bypass valve or the like can be controlled to open when the temperature would be damaging to the catalyst and close when the temperature drops to a proper catalyst operating range. In operation, the capillary tube 31 and diaphragm 33 are responsive to changes in temperature at the bulb end of the capillary tube. Increasing temperature causes the diaphragm having contact 35 thereon to move upward and make contact with contact 39. Decreasing temperature causes it to move away from contact 39 and break contact. This is achieved by the respective expansion and contraction of the filler material inside the capillary tube and diaphragm assembly. A specific switch point can be achieved by adjusting contact 39 to make contact with the contact 35 on the diaphragm at a specific temperature desired. The electrical circuit is from connector 43 to contact 39 to contact 35 on the diaphragm attached to the end of the capillary tube to the tube holder 37 to the body 12 which is ground.

It is readily apparent that the temperature switch is an easily constructed simple device that is easily assembled and has a replaceable sensor at one end that can be readily serviced at minimal cost.

While the embodiments of the invention as herein disclosed constitute a preferred form, it is to be understood that other forms could be adopted.

I claim:

1. A temperature responsive electrical switch comprising: a body having attachment means thereon; a first tubular member having one end in said body in electrical contact therewith, and the other end extending therefrom; first contact means on the one end of said first tubular member; a second tubular member within said first tubular member having second contact means opposite said first contact means; spring means electrically connecting said second contact means to a terminal on said body; said second tubular member being in contact with an expendable sensing means at the end opposite said second contact means thereon, said expendable sensing means mounting said first and second contacts open; insulator means electrically insulating said contacts, springs, and terminals from said body; and a temperature responsive means within said second tubular member electrically insulated therefrom and having an expandable diaphragm at one end; contact means on said diaphragm; third contact means opposite said contact means on said diaphragm being within a terminal on said body.

2. A temperature responsive electrical switch adapted to be used in a catalytic converter to detect catalyst failure comprising: a body having attachment means thereon; a first tubular member having one end in said body in electrical contact therewith, and the other end extending therefrom; first contact means on the one end of said first tubular member; a second tubular member within said first tubular member having second contact means opposite said first contact means; spring means electrically connecting said second contact means to a terminal on said body; insulator means electrically insulating said contacts, springs, and terminals from said body; said second tubular member being in contact with a first temperature responsive expendable rod formed of a substantially similar catalyst as used in the converter; said expendable rod being held in a container that is attached to said first tubular member by removable connector means, and being of sufficient length to force said second tubular member to maintain said first and second contacts in a normally open position whereby upon catalyst failure in the converter said catalyst rod shrinks to cause the first and second set of contacts to close and provide a signal and a second temperature responsive capillary tube means within said second tubular member electrically insulated therefrom and adapted to provide a second independent signal; having a metal diaphragm at one end with a capillary tube holding member adjacent said diaphragm and being attached to said body to hold said capillary tube within said second tubular member; contact means on said diaphragm; third contact means opposite said contact means on said diaphragm being within a terminal on said body with said terminal being insulated from said tube holding member.

* * * * *